United States Patent [19]
Mauch et al.

[11] 3,803,498
[45] Apr. 9, 1974

[54] VOLTAGE DETECTION CIRCUIT
[75] Inventors: John W. Mauch, Danville; Walter J. Sawick, Napa, both of Calif.
[73] Assignee: The United States of America as represented by the Secretary of the Navy, Washington, D.C.
[22] Filed: July 11, 1972
[21] Appl. No.: 270,781

[52] U.S. Cl. ............... 328/132, 307/231, 307/235 R, 328/114
[51] Int. Cl. ............................................. H03k 5/20
[58] Field of Search ............ 328/114, 132; 307/231, 307/235; 250/71.5, 83.3 R

[56] References Cited
UNITED STATES PATENTS
3,512,093   5/1970   Perreault ...................... 328/114 X

*Primary Examiner*—John Zazworsky
*Attorney, Agent, or Firm*—R. S. Sciascia; Charles D. B. Curry

[57] ABSTRACT

A detection circuit for indicating changes in the DC output of a photomultiplier tube where such changes represent error signals that depart from the normal signal. The output of the photomultiplier tube is applied to a picoammeter that provides a DC voltage proportioned to the current output of the photomultiplier tube. The output of the picoammeter is applied to a first derivative device that output of which is applied to a second derivative device and first derivative gate. The output of the second derivative device is applied to a second derivative gate. The output of said second derivative gate is applied to a pulse generating circuit that is responsive to the second derivative of the error signal. The pulse generating circuit turns the first and second derivative gate on and off. The first derivative gate is on during that time when the error signal occurs. The error signal is then recorded at the output of the first derivative gate.

4 Claims, 3 Drawing Figures

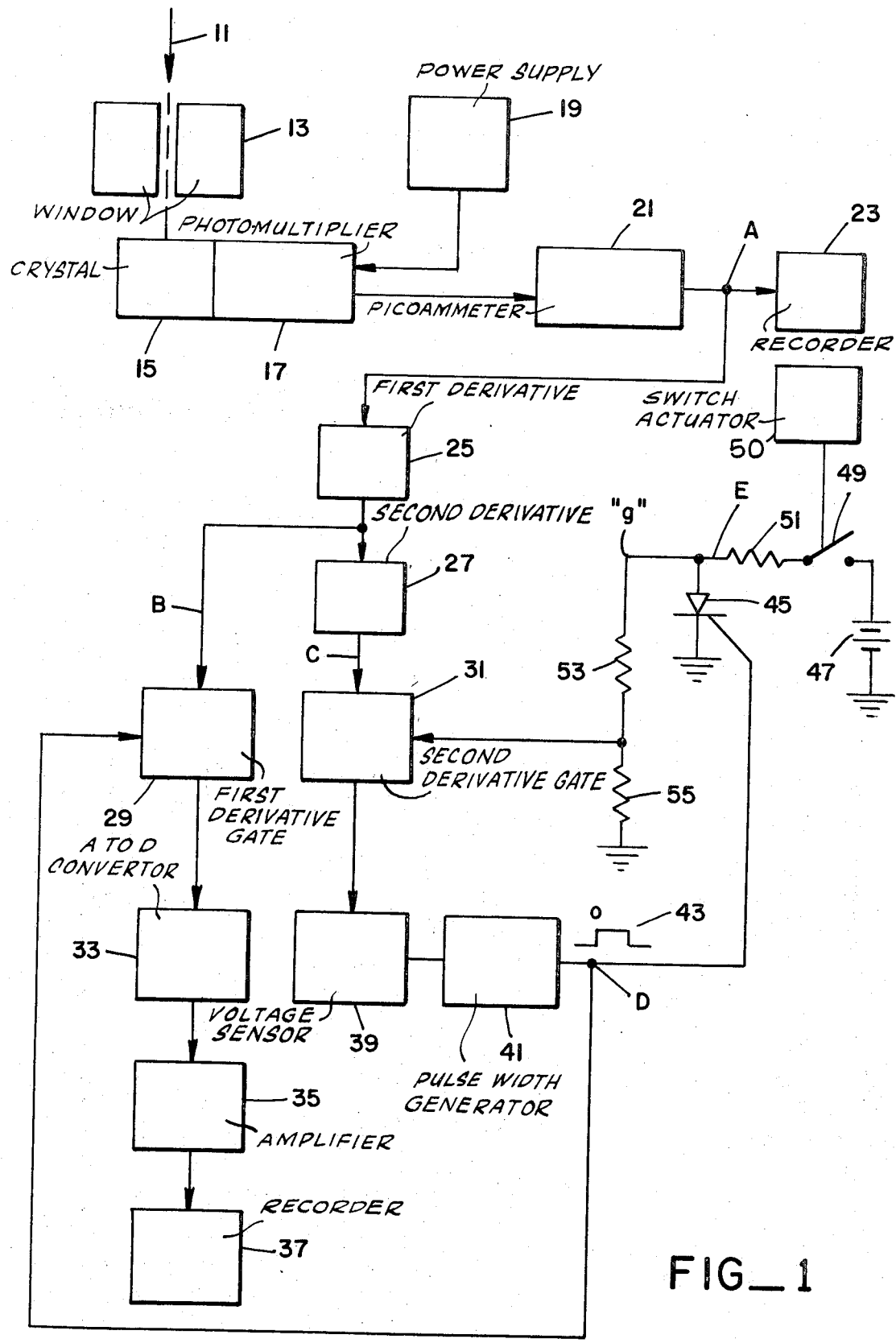
FIG_1

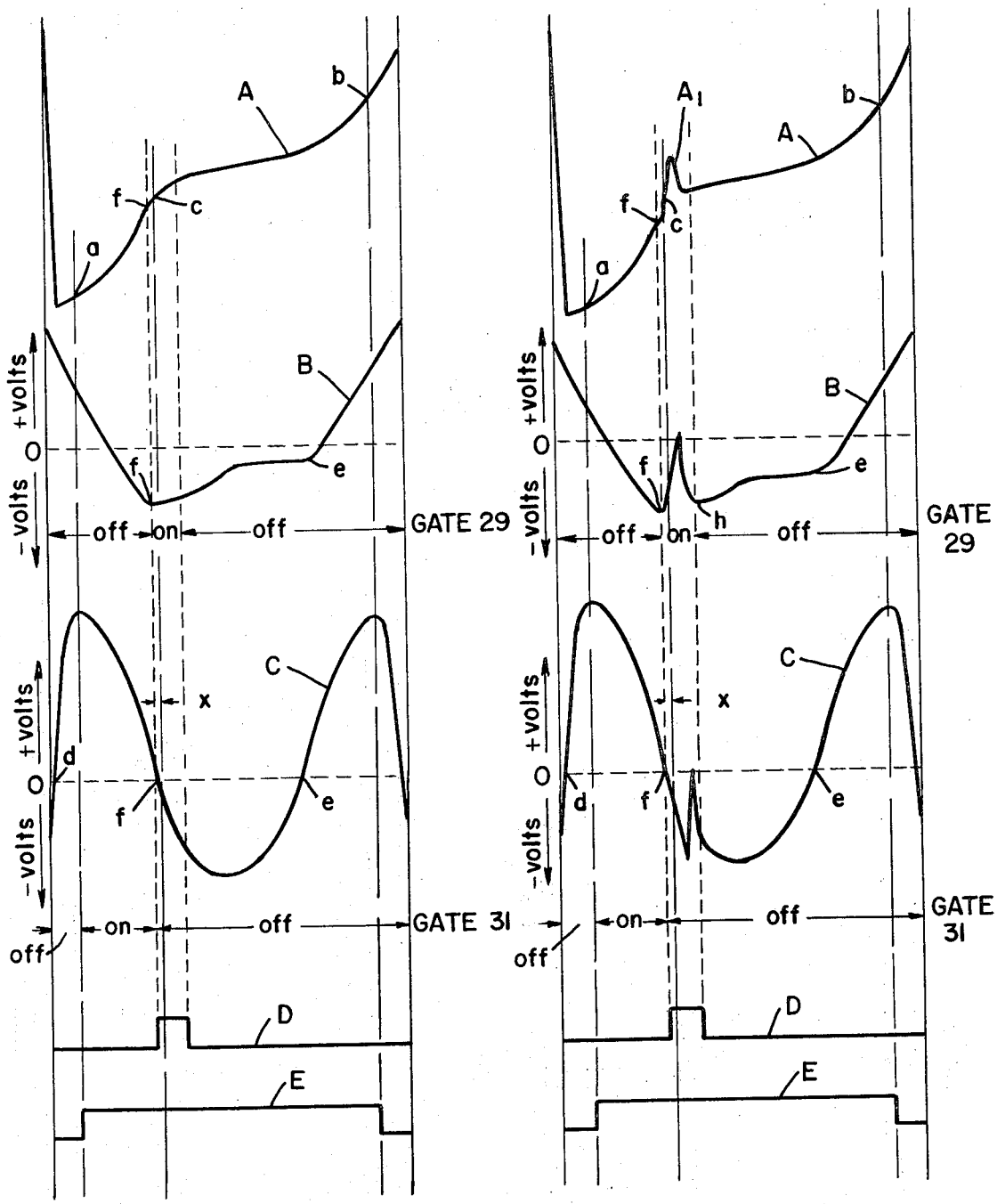
FIG_2  FIG_3

VOLTAGE DETECTION CIRCUIT

BACKGROUND OF THE INVENTION

1. Field of the Invention

The present invention relates to a voltage detection circuit, and more particularly, to a voltage detection circuit that detects error signals that depart from the normal output of photomultiplier tubes and the like.

2. Description of the Prior Art

Prior techniques for indicating changes in the DC output of a photomultiplier tube, where such changes represent error signals that depart from the normal curve, have generally consisted of direct recording devices. These devices have had the primary disadvantages of recording unwanted information. This required considerable reader time to extract the required information and to analyze the results. The present invention overcomes this disadvantage by providing a technique for sensing the change in the slope of a voltage curve from an increasing to a decreasing valve or from a decreasing to an increasing value. In addition, it provides a gating function that gates only the error signals. This eliminates the recording of unwanted normal signals and minimizes the time required for reading and extracting the required information.

SUMMARY OF THE INVENTION

Briefly, the present invention comprises a detection circuit for indicating changes in the DC output of a photomultiplier tube where such changes represent error signals that depart from the normal signal. The output of the photomultiplier tube is applied to a picoammeter that provides a DC voltage proportioned to the current output of the photomultiplier tube. The output of the picoammeter is applied to a first derivative device that output of which is applied to a second derivative device and first derivative gate. The output of the second derivative device is applied to a second derivative gate. The output of said second derivative gate is applied to a pulse generating circuit that is responsive to the second derivative of the error signal. The pulse generating circuit turns the first and second derivative gate on and off. The first derivative gate is on during that time when the error signal occurs. The error signal is then recorded at the output of the first derivative gate.

STATEMENTS OF THE OBJECTS OF INVENTION

An object of the present invention is to provide a voltage detection circuit that is reliable and accurate.

Another object is to provide a detection circuit for sensing the change in slope of a voltage curve from an increasing to a decreasing value or from a decreasing to an increasing value.

Still another object is to provide a detection circuit that provides a gating function that gates only error signals.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic diagram of the voltage detection circuit of the present invention;

FIG. 2 is a group of curves illustrating the operation of the detection circuit of FIG. 1 when there is no defect or error signal; and FIG. 3 is a group of curves illustrating the operation of the detection circuit of FIG. 1 when there is a defect or an error signal.

DESCRIPTION OF THE PREFERRED EMBODIMENTS

In FIG. 1 is illustrated a schematic diagram of a detection circuit which may be used to indicate changes in the DC output of a photomultiple tube. More particularly, this detection circuit may be used in the nondestructive test device of a co-pending patent application. Ser. No. 270,780, filed July 11, 1972, entitled Nondestructive Test Device Using Radiation to Detect Flaws in Materials, by Howard Heffan et al. When used for this purpose, it denotes the location of the liner-propellent (L-P) interface and gates the first derivative output of the photomultiplier at the L-P interface.

The change to be detected by the detection circuit of the present invention may be contained, for example, in changes of intensity of radiation 11, which may be gamma radiation, passing through window 13 and impinging upon sodium iodide scintillation crystal 15 of photomultiplier tube 17. High voltage power is supplied to the photomultiplier tube by means of high voltage power supply 19.

The output of photomultiplier tube 17 is applied to the input of picoammeter 21. Picoammeter 21 provides a DC output voltage proportional to the current output of photomultiplier tube 17. In FIGS. 2 and 3 curve A illustrates a typical output of picoammeter 21 when the radiation 11 represents the nonabsorbed radiation passing through a motor casing such as described in the above co-pending patent application. Curve A of FIG. 2 represents the output when there is no defect in the motor whereas curve A of FIG. 3 represents the output when there is a defect. It is to be understood, however, that the use of this circuit is not limited to the above described use, but rather, it may be used to detect any voltage changes where the slope of the voltage curve changes from an increasing to a decreasing value, or from a decreasing to an increasing value.

The output of picoammeter 21 is applied to strip chart recorder 23, for permanent records, and to the input of first derivative device 25, the output of which is connected to the input of second derivative device 27. The outputs of first and second derivative device are respectively applied to the inputs of first and second derivative gates 29 and 31. Gates 29 and 31 may be a field effect transistor, for example.

The output of gate 29 is applied to the input of analog to digital convertor 33, the output of which is applied to the input of amplifier 35, the output of which is applied to the input of recorder 37 which may be of the C-scanner recorder type. The output of gate 31 is applied to the input of voltage sensor 39 which provides an output signal when gate 31 is turned on and second derivative device 27 has a zero voltage output. The second derivative device 27 provides a zero output voltage (point $f$, curves C of FIGS. 2 and 3). When the slope of the first derivative is zero (point $f$, curves B of FIGS.

2 and 3), which occurs when curves A change from an increasing to a decreasing slope or from a decreasing to an increasing slope. When zero voltage is sensed by voltage sensor 39 it supplies an output signal to the input of pulse width generator 41 which produces a pulse 43, the length of which may be varied by adjustment of pulse generator 41 depending upon the particular needs. It has been found that about 100 milliseconds is an appropriate time duration of pulse 43. The output of pulse width generator 41 is applied to the gate of silicon controlled rectifier 45 and to the trigger of gate 29.

A DC power source 47 is connected through switch 49, resistor 51, resistor 53 to the trigger of gate 31. Resistor 53 is connected through resistor 55 to ground. Switch 49 is closed at the beginning and opened at the end of each cycle of operation, as illustrated by curve E of FIGS. 2 and 3. Switch 49 may be connected to the scanner, described in the co-pending patent application Ser. No. 270,780, filed July 11, 1972, entitled Nondestructive Test Device Using Radiation to Detect Flaws in Materials, by Howard Heffan et al., or any other switch actuator means 50 in the system which indicates the full scan. Switch 49 functions to eliminate the transients at the end of signal A from picoammeter 21. It also functions to eliminate false or unwanted zero voltage readings from the second derivative device 31, such as would occur at points $d$ and $e$ of curves C of FIGS. 2 and 3. The reason for this will become apparent from the following description of operation.

In operation, when switch 49 is closed, a positive voltage will appear at the trigger of gate 31 which will turn gate 31 on. Gate 31 will be turned off when the trigger is at ground potential. Referring to FIGS. 2 and 3, when the output of the second derivative device 31 is zero, point $f$, then voltage sensor 39 will sense this and cause pulse width generator 41 to provide an output pulse 43. The leading edge of pulse 43 causes silicon controlled rectifier 45 to turn on which shunts the voltage at $g$ of FIG. 1 to ground. This causes gate 31 to turn off and it will remain off so long as current continues to pass through silicon controlled rectifier 45 from DC source 47 to ground. It should be noted that switch 49 remains closed for a substantial period of time after the termination of pulse 43. This is done to allow for variation in position of the L-P interface. That is, point $f$ of the curves would be shifted to the right if the interface was shifted towards the outside of the motor casing.

The output of pulse width generator 41 is also applied to gate 29 wherein pulse 43 turns gate 29 on and keeps it on for the entire duration of pulse 43, as indicated by curve D of FIGS. 2 and 3. Therefore, gate 29 is on during that portion of curves B of FIGS. 2 and 3, as indicated. This corresponds with the time that the defect, indicated as $A_1$ in curve A of FIG. 3, occurs during the scan. It is possible to provide this window of the defect because at point $f$ the slope of curve A changes from an increasing to a decreasing value. At point $f$ in curve B the slope is zero because the first derivative of the change from an increasing to a decreasing value is zero slope. The second derivative at this point results in a zero output voltage, as indicated at points $f$ of curves C. Point $f$ is the trigger point where the start of the window for the first derivative occurs (curves B). Point $f$ is also the point ending the window for the second derivative (curves C). The window for the second derivative is shut off at point $f$ to prevent any other zero voltage outputs from second derivative device 27 from triggering gate 29. This would occur, for example, at points $e$ and $h$ of curves B.

It should be noted that for liner-propellant interface detection the distance X of curves C of FIGS. 2 and 3 is about 0.030 inch and is prior to the L-C interface. This assures that the window of the first derivative will view the entire defect which will then be recorded on recorder 37.

What is claimed is:
1. A detection circuit comprising:
   a. a first derivative device;
   b. a second derivative device;
   c. a first derivative gate;
   d. the output of said first derivative device being operatively connected to the input of said second derivative device and to the input of said first derivative gate;
   e. means responsive to the output of said second derivative device for actuating said first derivative gate; and
   f. said means includes a voltage sensor, a second derivative gate and a pulse width generator.
2. The device of claim 1 wherein:
   a. the output of said second derivative device is connected to the input of said second derivative gate the output of which is connected to the input of said voltage sensing device, the output of which is connected to the input of said pulse width generator; and
   b. the output of said pulse width generator being connected to the trigger of said first derivative gate.
3. The device of claim 2 including:
   a. a switching circuit;
   b. said switching circuit being operatively connected to the trigger of said second derivative gate; and
   c. the output of said pulse width generator being operatively connected to said switching circuit.
4. The device of claim 3 wherein:
   a. said switching circuit includes a silicon controlled rectifier, a switch and a DC power source; and
   b. said DC power source being connected through said switch to said silicon controlled rectifier and to the trigger of said second derivative gate.

* * * * *